US006978475B1

(12) United States Patent
Kunin et al.

(10) Patent No.: US 6,978,475 B1
(45) Date of Patent: Dec. 20, 2005

(54) METHOD AND APPARATUS FOR INTERNET TV

(75) Inventors: David Kunin, Minneapolis, MN (US); Sergey Tolkachev, Bloomington, MN (US); Robert Freidson, Bloomington, MN (US); Boaz Vinogradov, Scottsdale, AZ (US)

(73) Assignee: eCable, LLC, Minneapolis, MN (US)

( * ) Notice: Subject to any disclaimer, the term of this patent is extended or adjusted under 35 U.S.C. 154(b) by 558 days.

(21) Appl. No.: 09/686,114

(22) Filed: Oct. 11, 2000

Related U.S. Application Data

(60) Provisional application No. 60/167,505, filed on Nov. 24, 1999.

(51) Int. Cl.$^7$ .............................................. H04N 7/173
(52) U.S. Cl. ...................... 725/106; 725/109; 725/110; 725/112
(58) Field of Search ........................ 725/51, 106, 109, 725/110, 112, 60; 704/246, 257, 270, 270.1, 704/275; 379/88.1

(56) References Cited

U.S. PATENT DOCUMENTS

| | | |
|---|---|---|
| 5,014,125 A | 5/1991 | Pocock et al. |
| 5,335,313 A | 8/1994 | Douglas |
| 5,497,373 A | 3/1996 | Hulen et al. |
| 5,499,048 A | 3/1996 | Seo |
| 5,500,794 A | 3/1996 | Fujita |
| 5,583,965 A | 12/1996 | Douma |
| 5,640,192 A | 6/1997 | Garfinkle |
| 5,661,783 A | 8/1997 | Assis |
| 5,682,525 A | 10/1997 | Bouve et al. |
| 5,684,918 A | 11/1997 | Abecassis |
| 5,701,451 A | 12/1997 | Rogers et al. |
| 5,710,918 A | 1/1998 | Lagarde et al. |
| 5,721,908 A | 2/1998 | Lagarde et al. |
| 5,745,754 A | 4/1998 | Lagarde et al. |
| 5,745,909 A | 4/1998 | Perlman et al. |

(Continued)

FOREIGN PATENT DOCUMENTS

| CA | 2205693 | 11/1997 |
|---|---|---|

(Continued)

OTHER PUBLICATIONS

Weekend Journal, You Don't Need A Personal Computer, Sep. 17, 1999.

(Continued)

*Primary Examiner*—Kieu-Oanh Bui
(74) *Attorney, Agent, or Firm*—Cooley Godward LLP

(57) ABSTRACT

A telephone interface and voice recognition driven Internet browser system and method for accessing/browsing the Internet on a cable or satellite television includes a phone for receiving a voice signal from a user. The voice signal controls a telephone interface which displays Internet contents on the television via a cable or satellite television channel. The system also includes a voice recognizer, preferably operated on a supercomputer, for recognizing/interpreting/analyzing the voice signal and generating command signals to access/browse the Internet. The voice recognizer is capable of recognizing/interpreting/analyzing voice signals transmitted from a plurality of users in real time. The system further includes a stack of computers and an Internet browser. Each of the stack of computers is capable of accessing/browsing the Internet and retrieving/organizing requested Internet contents via the Internet browser. The requested Internet contents are sent to the user via a cable or satellite television channel.

25 Claims, 4 Drawing Sheets

U.S. PATENT DOCUMENTS

| | | | |
|---|---|---|---|
| 5,752,246 A | 5/1998 | Rogers et al. | |
| 5,757,417 A * | 5/1998 | Aras et al. | 725/14 |
| 5,761,663 A | 6/1998 | Lagarde et al. | |
| 5,774,664 A | 6/1998 | Hidary et al. | |
| 5,778,181 A | 7/1998 | Hidary et al. | |
| 5,793,964 A | 8/1998 | Rogers et al. | |
| 5,799,063 A | 8/1998 | Krane | |
| 5,832,223 A | 11/1998 | Hara et al. | |
| 5,844,552 A | 12/1998 | Gaughan et al. | |
| 5,884,262 A | 3/1999 | Wise et al. | |
| 5,884,284 A | 3/1999 | Peters et al. | |
| 5,890,123 A | 3/1999 | Brown et al. | |
| 5,903,870 A | 5/1999 | Kaufman | |
| 5,915,001 A | 6/1999 | Uppaluru | |
| 5,923,736 A | 7/1999 | Shachar | |
| 5,929,849 A | 7/1999 | Kikinis | |
| 5,940,074 A | 8/1999 | Britt, Jr. et al. | |
| 5,945,989 A | 8/1999 | Freishtat et al. | |
| 5,946,050 A | 8/1999 | Wolff | |
| 5,950,167 A | 9/1999 | Yaker | |
| 5,953,046 A | 9/1999 | Pocock | |
| 5,958,016 A | 9/1999 | Chang et al. | |
| 5,974,441 A | 10/1999 | Rogers et al. | |
| 5,999,207 A | 12/1999 | Rodriguez | |
| 6,005,563 A | 12/1999 | White et al. | |
| 6,006,265 A | 12/1999 | Rangan et al. | |
| 6,157,935 A * | 12/2000 | Tran et al. | 715/503 |
| 6,219,709 B1 | 4/2001 | Byford | |
| 6,243,676 B1 * | 6/2001 | Witteman | 704/243 |
| 6,253,238 B1 * | 6/2001 | Lauder et al. | 709/217 |
| 6,543,052 B1 * | 4/2003 | Ogasawara | 725/60 |
| 6,546,002 B1 * | 4/2003 | Kim | 370/351 |
| 6,577,605 B1 * | 6/2003 | Dagate et al. | 370/270 |
| 6,587,822 B2 * | 7/2003 | Brown et al. | 704/275 |

FOREIGN PATENT DOCUMENTS

| | | |
|---|---|---|
| EP | 0 123 369 B1 | 12/1986 |
| EP | 0 723 369 A1 | 7/1996 |
| EP | 0 840 509 A2 | 5/1998 |
| EP | 0 843 458 A2 | 5/1998 |
| EP | 0 854 417 A2 | 7/1998 |
| EP | 0 948 216 A2 | 10/1999 |
| EP | 0 840 509 B1 | 3/2004 |
| GB | 2 329 310 A | 3/1999 |
| JP | 10-63458 | 10/1998 |
| JP | 10-98654 | 10/1998 |
| JP | 10-191463 | 10/1998 |
| JP | 10-996349 | 10/1998 |
| JP | 11-18060 | 11/1998 |
| JP | 11-154131 | 11/1998 |
| JP | 11-242644 | 11/1998 |
| JP | 11-25114 | 11/1999 |
| JP | 11-249867 | 11/1999 |
| TW | 313727 | 5/1985 |
| WO | WO 95/06309 | 3/1995 |
| WO | WO 97/24826 | 7/1997 |
| WO | WO 98/05145 | 2/1998 |
| WO | WO 98/09243 | 3/1998 |
| WO | WO 98/43381 | 10/1998 |
| WO | WO 98/56188 | 12/1998 |
| WO | WO 99/04342 | 1/1999 |
| WO | WO 99/08084 | 2/1999 |
| WO | WO 99/14678 | 3/1999 |
| WO | WO 99/31814 | 6/1999 |
| WO | WO 99/31871 | 6/1999 |
| WO | WO 00/44168 | 7/2000 |

OTHER PUBLICATIONS

XP 000659566, Integrated Web and telephone Service Creation, Bell Labs Technical Journal, Winter 1997, by David L. Atkins et al.

* cited by examiner

METHOD AND APPARATUS FOR INTERNET TV

RELATED APPLICATION

This application claims the benefit of Provisional Application, U.S. Ser. No. 60/167,505, filed on Nov. 24, 1999, entitled "METHOD AND APPARATUS FOR INTERNET TV", by David Kunin, Sergey Tolkachev, Robert Freidson, and Boaz Vinogradov.

BACKGROUND OF THE INVENTION

1. Field of the Invention

The present invention relates to a remote-controlled television Internet system and method, and more particularly, to a telephone interface and voice recognition driven Internet browser system and method for Internet accessing and browsing on a cable or satellite television.

2. Description of Related Art

In entering into the twenty-first century, Internet business or e-commerce has become one of the largest industries and continues its growth exponentially. Many people's daily lives are closely related to the Internet business and are significantly impacted by the Internet technology's evolution and revolution. More and more people have used the Internet and even accessed/browsed the Internet in their daily lives, whether for work, entertainment, shopping, or education, etc. The Internet is creating a new economy which is competing with people's traditional way of living.

Like many other new technology, Internet technology is facing many challenges and problems, particularly when Internet technology is penetrating into the general public. One of the main problems is that Internet accessing/browsing often requires one to know how to use a personal computer. At present, still the majority of the general public is not computer literate or may not care to be computer literate. Many people have found that a personal computer is clumsy, expensive to maintain and/or upgrade, and often not reliable. As a result, many people still avoid using a personal computer.

Further, even if one uses a personal computer, to access/browse the Internet is often problematic. For example, the Internet connection between a computer and Internet providers is often denied during a peak time, and the Internet connection is generally very slow in uploading/downloading Internet information. People have to pay much more monthly fees to obtain a relatively higher speed access to the Internet. Such fees put the access to the Internet out of reach of most people.

In addition, a personal computer is usually used for a lot of different applications, such as word processing, imaging designing, networking, email, Internet accessing/browsing web sites, etc. These applications and the computer itself are co-existed and generally operated by a complicated software operating system, thereby significantly slowing down the operations of the applications. The more applications are operated by an operating system, the slower the operation speed is. This significantly slows down the performance of the Internet accessing/browsing. The operation overhead of most personal computers is not optimized for advanced Internet performance like streaming video or other high volume data transmission applications.

Also, a personal computer does not provide a comfortable setting for people to surf the Internet for entertainment, shopping, education, etc. As a result, many people, even if they own a personal computer, have been looking for other alternatives to access the Internet.

Some recent Internet technology has demonstrated its ability to access/browse the Internet without a personal computer by using new types of devices broadly called "information appliance"—essentially, they are digital gadgets of various sizes and shapes, which are dedicated to surfing the Internet. Some devices resemble cable TV boxes, and some others look like small laptops, mobile phones, etc. Some devices are used to surf the Internet and access e-mails, and some others are strictly used to surf the Internet. While people have saved money from buying a personal computer, they are forced to purchase as well as maintain a new line of "information appliance" for different purposes. Furthermore, these new devices are basically small sized computers for different specific purposes. However, many people still are not interested in buying a new device just to surf the Internet.

The general public is used to conventional devices, such as televisions, phones, etc. Also, the majority of the general public has already owned these conventional devices. They are easy to operate and relatively reliable in performance. Therefore, there is a desire for the general public to access/browse the Internet via these conventional devices without using a personal computer, or other hardware equipment, such as modem, "information appliance", etc. Just like many people have quit buying an answering machine for storing phone messages—instead, using a "hardware-less" voice messaging service—, there is a need to have a "hardware-less" Internet service to access/browse the Internet via conventional televisions and phones.

Most of the homes or offices have recently been wired for cable broadcast, which may hook to a set top box and a cable ready television, or wired for a satellite receiver to receive multiple television channels. It is desirable to use the existing cable wiring or satellite receiver to receive Internet information.

Internet TVs were proposed several years ago. Internet TVs were proposed to provide people the possibility of obtaining Internet access at a location, such as at home, by using only a regular cable TV set and an easy-to-use control device, such as a phone. For example, a concept of a telephone remote-controlled cable television Internet was once introduced, in which button keys of a push button-type telephone at a cable television subscriber's end are used to simulate functions of a computer mouse or a computer keyboard to remote-control, via a telephone network, an Internet main unit at a cable television provider's end, so as to acquire Internet resources around the world.

However, the proposed Internet TVs are very primitive and immature. Due to the communication channel band limitation, the proposed Internet TVs cannot serve a large amount of users at the same time. In addition, the push button-type telephone interface is not user-friendly. People are not used to relate the button keys or their corresponding English letters on a telephone to the represented functions or modes. Also, different telephones may have a different arrangement for the button keys. These make surfing the Internet very time consuming and uncomfortable. Further, the button keys on a telephone may malfunction after a period of use. Furthermore, quite a few people are still using conventional rotary telephones which do not have push button keys.

The Internet TVs were proposed to allow a user to surf the Internet on TV. However, the proposed Internet TVs mainly provide a bridge between the Internet URL sources and the cable TV systems by stream-downloading whatever the URL sources present. Users may not very easily browse Internet contents to find what they are looking for because the stream-downloaded Internet contents are merely related to certain URL sources or destinations. Many users have wasted a lot of time in looking for URL sources and/or in browsing Internet contents. Users often desire assistance in an interactive manner to not only find a URL source for certain Internet contents, but also have a user-friendly interface to find the URL source and go through the Internet contents. Also, the users would often like to organize Internet contents in a specific fashion.

It is with respect to these or other considerations that the present invention has been made.

SUMMARY OF THE INVENTION

To overcome the limitations in the prior art described above, and to overcome other limitations that will become apparent upon reading and understanding the present specification, the present invention discloses a telephone controlled cable or satellite television Internet system and method.

The present invention solves the above-described problems by using a telephone interface and voice recognition driven Internet browser system and method for Internet accessing/browsing on a cable or satellite television. One of the cable or satellite channels is designated for the Internet accessing/browsing.

In one embodiment of the present invention, a system for accessing/browsing the Internet on a cable or satellite television, includes: a phone for receiving a voice signal from a user, the voice signal controlling an Internet interface which displays Internet content on the television via a cable or satellite channel; a voice recognizer, operated on a supercomputer or other computer platforms (e.g. CPU platforms), recognizing/interpreting/analyzing the voice signal and generating command signals to access/browse the Internet, the voice recognizer being capable of simultaneously recognizing voice signals transmitted from a plurality of users and generating command signals for accessing/browsing the Internet; and a stack of computers (or like devices optimized for Internet accessing/browsing) and an Internet browser, each of the stack of computers, based on the command signals from the voice recognizer, accessing/browsing the Internet and retrieving/organizing Internet content via the Internet browser, the Internet content being sent to the cable or satellite television via cable or satellite media.

Further in one embodiment of the present invention, the voice recognizer operated on the supercomputer or other computer platforms is disposed in a phone switching network. In another embodiment, the voice recognizer operated on the supercomputer or other computer platforms is disposed in a cable or satellite system.

Still in one embodiment of the present invention, the accessed, browsed, or organized Internet content is presented on the cable or satellite television and interactive with the user's voice signal.

Additional in one embodiment of the present invention, the cable or satellite television further includes a set top box/filter having an identification. If an identification of the phone does not match with the identification of the set top box/filter, the Internet content is filtered out. If the identification of the phone matches with the identification of the set top box/filter, the Internet content is presented on the television.

Yet in one embodiment of the present invention, the cable or satellite television further includes a frame grabber device for locally refreshing the content of the Internet information presented on the television until a subsequent request being made by a user via the phone.

Yet in one embodiment of the present invention, the voice signal may include a plurality of instructions of accessing/browsing the Internet content, and/or a plurality of menu instructions, such as "go back" to the previous frame, "go to" the main page, etc.

Still in one embodiment of the present invention, the phone switching network is coupled to a plurality of users' phones for routing corresponding plurality of voice signals from the plurality of users to the voice recognizer for recognizing/interpreting/analyzing the corresponding voice signals and generating command signals to access/browse the Internet on the cable or satellite system. The system includes at least one Internet browser. The Internet browser can be run on a computer or a stack of computers, for accessing, browsing, and/or organizing Internet contents based on the command signals from the voice recognizer and presenting accessed, browsed, and/or organized Internet contents or user instructions from the cable or satellite system to the cable or satellite television.

In one embodiment of the present invention, a method of accessing/browsing the Internet via a cable or satellite television includes: receiving a voice signal from a user, the voice signal controlling an Internet interface which displays the Internet content on the cable or satellite television via a cable or satellite channel; routing the voice signal to a voice recognizer; recognizing/interpreting/analyzing the voice signal and generating command signals to access/browse the Internet contents on a cable or satellite system by a supercomputer, the voice recognizer being capable of simultaneously recognizing/interpreting/analyzing a plurality of voice signals transmitted from a plurality of users and generating the command signals for accessing/browsing the Internet; accessing, browsing, and/or organizing Internet contents based on the command signals from the voice recognizer; and presenting accessed, browsed, and/or organized Internet content from the cable or satellite system to the cable or satellite television via a cable or satellite channel.

Additionally in one embodiment, the method further includes the step of receiving a second voice signal which is interactive to the Internet content presented on the cable or satellite television.

Further in one embodiment of the present invention, the operation of the voice recognizer on the supercomputer is in the phone switching network. In an alternative embodiment, the operation of the voice recognizer on the supercomputer is in the cable or satellite system.

Still in one embodiment of the present invention, the method further includes the step of filtering out the signals received from the cable or satellite channel if an identification of the phone does not match with an identification of a filter, and passing through the signals if the identification of the phone matches with the identification of the filter.

Yet in one embodiment of the present invention, the method further includes the step of locally refreshing the content of the Internet information presented on the television until a subsequent request being made by a user via the phone.

The present invention provides a system capable of uploading voice signals via a narrow band wire, such as a phone line or a data port line (or referred to as the smaller wire), and downloading the Internet information via a broad band wire, such as cables or satellite receiver (or referred to as the larger wire). The larger wire is well suited to receive a large amount of data efficiently. Accordingly, the present invention uses voice recognition to upload a request via a telephone wire and download the requested data via a cable or satellite channel.

One advantage of the present invention is that it provides a user friendly interface such that a user does not have to be a computer literate to access/browse the Internet. Also, a computer does not have to be maintained and/or upgraded on an individual user basis.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the exemplary embodiment, reference is made to the accompanying drawings which form a part hereof, and in which it is shown by way of illustration the specific embodiment in which the invention may be practiced. It is to be understood that other embodiments may be utilized as structural changes may be made without departing from the scope of the present invention.

The present invention discloses a telephone controlled television Internet system and method. The present invention uses a telephone interface and voice recognition driven Internet browser system and method for Internet accessing/browsing on a cable or satellite television.

As an example, a system and method of accessing/browsing the Internet via a cable environment and a cable ready television are discussed below. It is appreciated that the system and method of accessing/browsing the Internet via a satellite television or any other broad band receivers can be implemented within the scope of the present invention.

Figure 1:
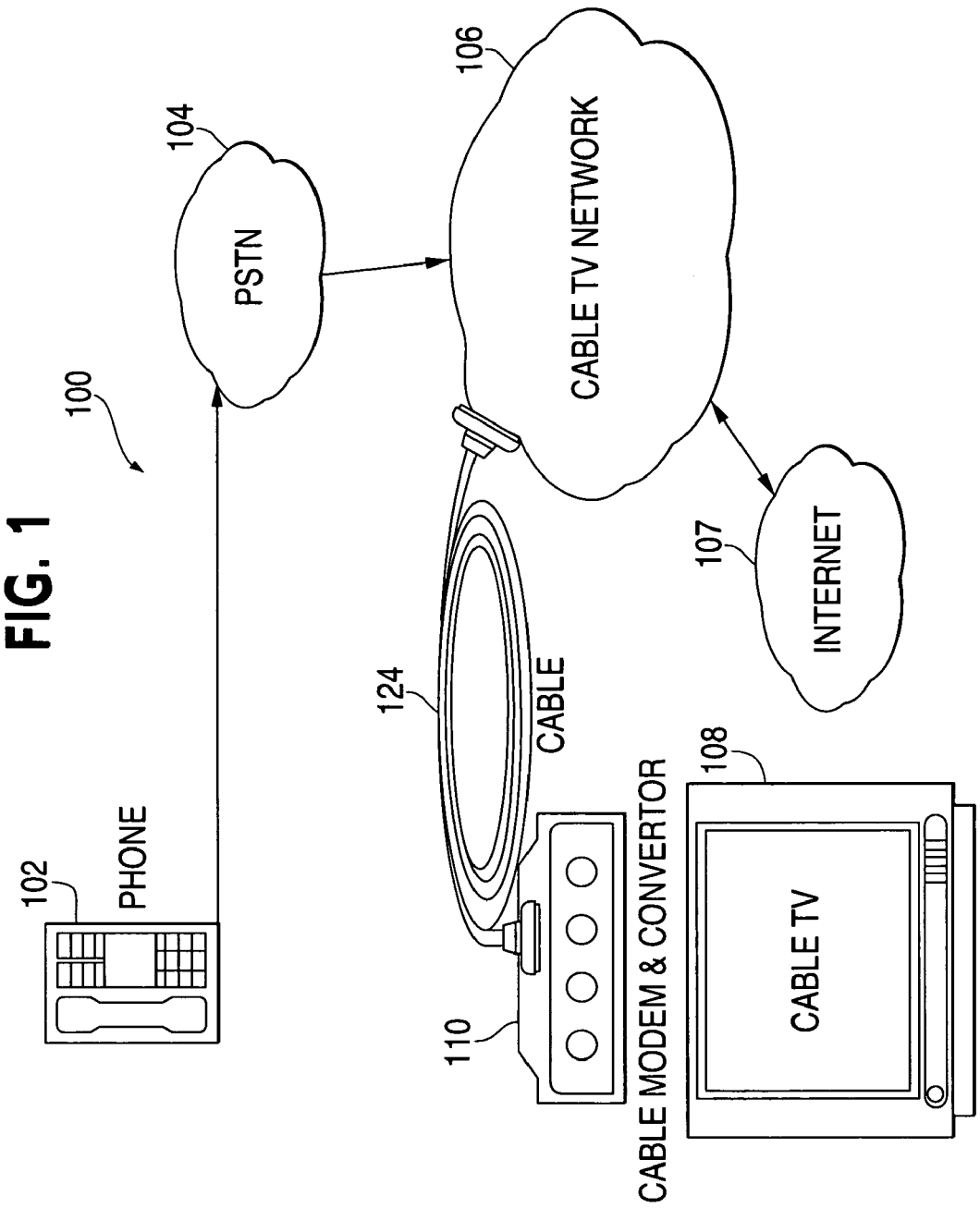
FIG. 1 illustrates a schematic diagram of one embodiment of a system for accessing/browsing the Internet via a cable television in accordance with the principles of the present invention.
Figure 2:
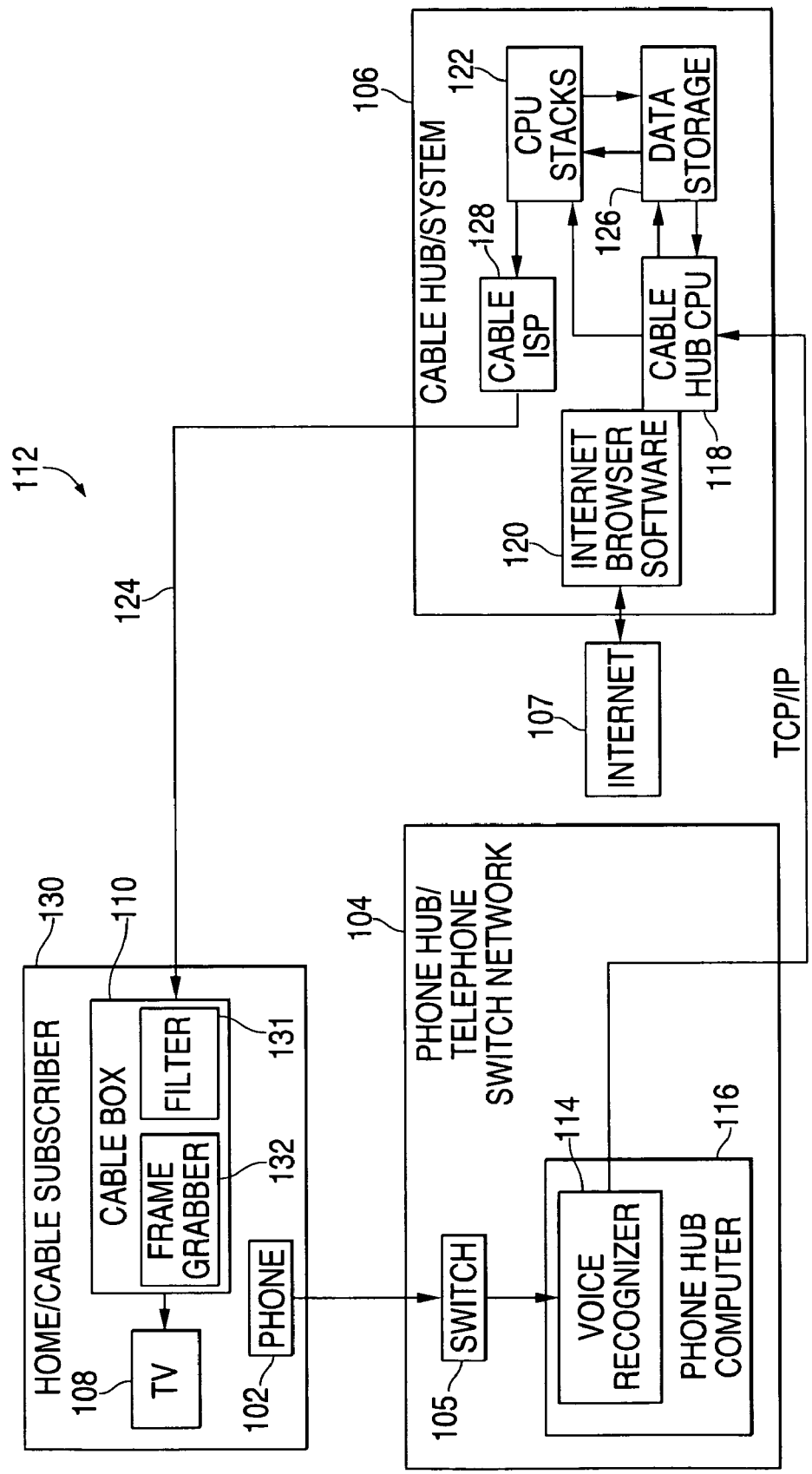
FIG. 2 illustrates a block diagram of one embodiment of a telephone interface and a voice recognition driven Internet browser system for Internet accessing/browsing on a cable television in accordance with the principles of the present invention.
Figure 3:
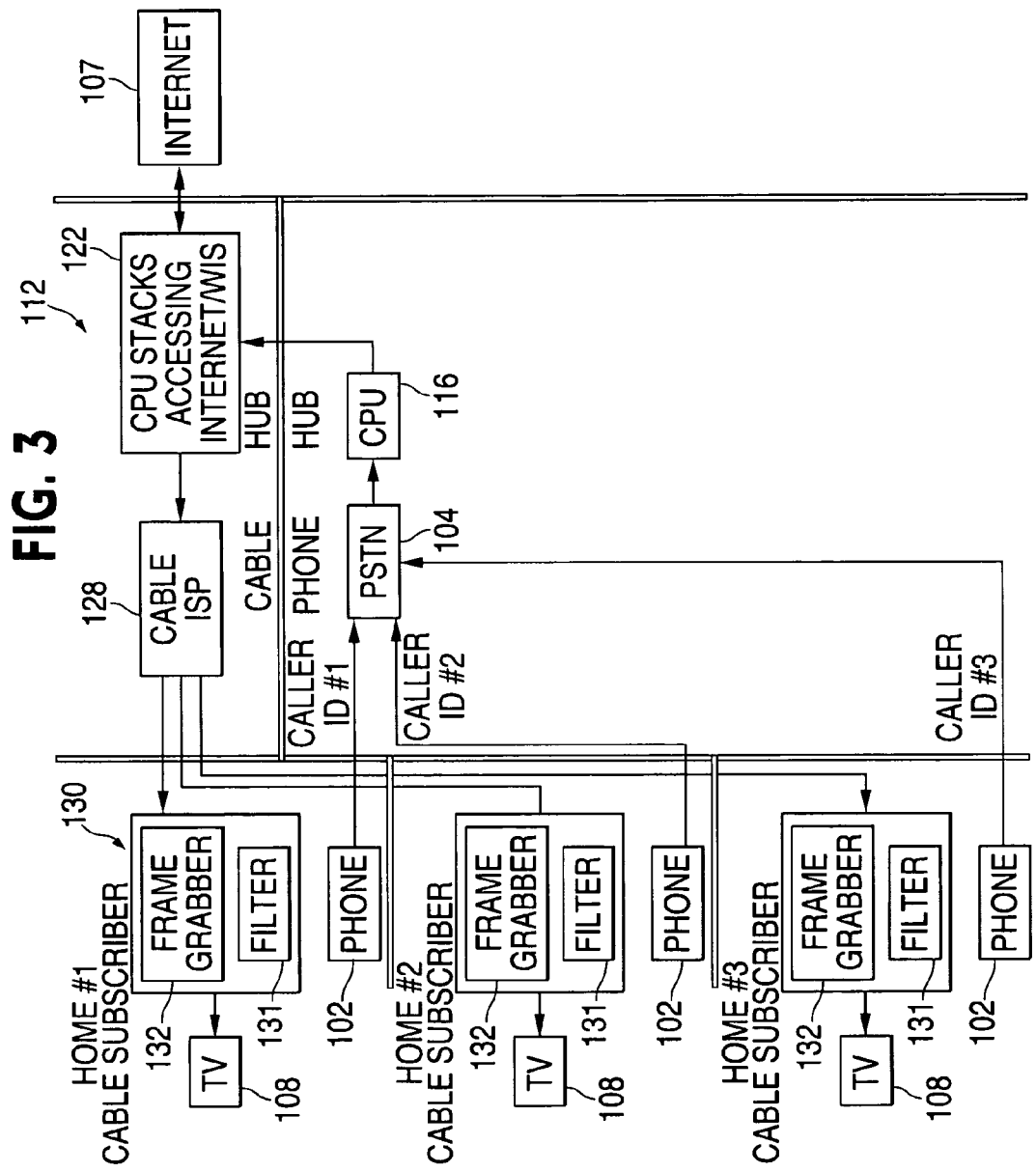
FIG. 3 illustrates a block diagram of one embodiment of the telephone interface and voice recognition driven Internet browser system implemented for a plurality of users to access/browse the Internet on their respective cable televisions in accordance with the principles of the present invention.

In FIG. 1, a telephone controlled cable television Internet system 100 is illustrated. A user's request for accessing/browsing the Internet or other menu instructions are keyed-in via a phone 102 with a unique caller identification (ID). Such request and caller ID are routed to a phone switching network 104 or referred to as a phone hub, such as a Public Switched Telephone Network (PSTN) or a Private Switched Telephone Network, etc. The request and caller ID are processed and sent to a cable TV network 106 or referred to as a cable hub system. The cable TV network 106 includes a stack of computers or CPUs as shown in FIGS. 2–3, each of which can be used to access/browse the Internet via an Internet browser. The stack of computers or CPUs can be arranged and configured to receive and process a number of command signals corresponding to users' requests. It is appreciated to a person skilled in the art that the capability of a computer would allow the stack of computers to process essentially a virtual amount of requests in real time. Computers can be upgraded or replaced at the cable TV network 106 end as opposed to at a user end. Accordingly, one of the advantages of the present invention is that a user does not have to be computer literate and/or maintain/upgrade a computer on an individual user basis.

The stack of computers access/browse the Internet 107 based on the respective command signals, and retrieve/organize the Internet contents and/or telephone interface command menu based on the Internet browser. The signals carrying the web contents and ID are then sent to cable subscribers to be viewed on a cable TV 108 via cable media 124. The cable TV 108 is coupled to a cable box 110 which includes a filter 131 (in FIG. 2). The filter filters out the Internet contents if the ID of the phone does not match with an identification of the filter (in FIG. 2). Thus, only the requester's television displays the requested contents and/or telephone interface command menu.

The cable box 110 also includes a frame grabber 132 which locally refreshes the Internet contents and/or telephone interface command menu until a subsequent request is made. The Internet contents and/or telephone interface command menu are presented on the cable TV to be viewed by the user.

Since the speed of making the subsequent request is much slower than the speed of cable TV transmission, the real time use of an Internet designated cable channel is significantly reduced. Accordingly, a virtual number of users can subscribe to such Internet designated cable channel without losing privacy of Internet contents that each of the user's is viewing. It will be appreciated that the Internet browser is customized and is interactive between the requester and the contents displayed.

The phone 102 is preferably coupled to a voice recognizer 114 (in FIG. 2) such that the requester may simply make a request by talking to the phone 102 without the necessity of entering keys or buttons on the phone. It is appreciated that the phone can be in a variety of forms, for example, a touch tone phone, a rotary phone, a cellular phone, a mobile phone, a speaker phone, a Personal Digital Assistant (PDA) phone, etc.

In FIG. 2, a telephone interface and voice recognition driven Internet browser system 112 for Internet accessing/browsing on the cable TV 108 is illustrated. The phone 102 receives voice signals from a user or requester. The voice signals control a display content, for example, the Internet contents and/or other telephone interface command/instruction menus, on the cable TV 108 via cable media or channels. The phone switching network or phone hub 104 is coupled to the phone 102 via a switch unit 105 for routing the voice signals to the voice recognizer 114. The voice recognizer 114 recognizes/interprets/analyzes the voice signals and generates command signals to access/browse the Internet. The voice recognizer 114 may be operated on a phone hub computer 116, for example, a supercomputer, such that the voice recognizer 114 is capable of simultaneously recognizing a plurality of voice signals transmitted from a plurality of users or requesters and generating command signals to access/browse the Internet. The supercomputer may be defined as a computer having a calculating speed of at least 1 billion times per second. The phone hub computer 116 can be implemented in many other computer platforms, e.g. CPU platforms, etc. It is appreciated that any other fast computer, such as parallel-processing computers, may be used within the scope of the present invention. Also, it is appreciated that the present invention does not limit to operating the voice recognizer 114 on a computer. The voice recognizer 114 may be operated on a voice card with DSP (Digital Signal Processing) and AgT with a memory, etc.

The command signals are then sent to the cable system 106. It is appreciated that the computer 116 which operates the voice recognizer 114 may also be implemented in the cable system 106 within the scope of the present invention.

In FIG. 2, the cable system 106 includes a cable hub computer or CPU 118 to access/browse the Internet 107. An Internet browser 120 is run on the cable hub computer or CPU 118 to retrieve/organize Internet contents from the Internet 107. The cable system 106 also includes a stack of computers or CPUs 122, each of which is operable with the cable hub computer or CPU 118 to access, browse, and/or organize the Internet contents and/or telephone interface command menu. It is appreciated that the Internet browser 120 may be run on the stack of computers or CPUs 122 directly to access, browse, and/or organize the Internet contents and/or telephone interface command menu to be subsequently presented on the respective cable TV 108. It is also appreciated that the voice recognizer 114 can reside on the CPU stacks 122 or on a remote network computer, and the command signals corresponding to the user's voice signals can be sent to the CPU stacks 122 from the remote network computer.

In FIG. 2, the cable system 106 may also include a data storage unit 126 for storing data or information, such as previously retrieved/organized Internet contents, telephone interface menu, etc. Accordingly, if the user only makes a request with a minor change to the previous Internet contents and/or telephone interface menu, the data or information stored in the data storage unit 106 may be used without the necessity of re-retrieving/re-organizing the Internet contents, thereby increasing the speed for processing the request.

In FIG. 2, the cable system 106 includes an Internet Service Provider (ISP) 28 or referred to as Cable/Internet Service Provider. The ISP 128 routes the cable signals to the cable box 110 of cable user/subscriber 130 via cable media or channel 124. The cable signals are received by the intended user 130, via a filter 131. The filter 131 preferably has a predetermined identification. If the predetermined identification of the filter 131 matches with the phone ID carried with the cable signals, the filter 131 allows the cable signals to be presented on the respective TV 108. If the phone ID does not match with the ID of the filter 131, the filter 131 filters out the cable signals downloaded from the channel 124. Accordingly, the other cable TV subscribers will not be able to view the requester/subscriber's Internet contents and/or telephone interface menu on their TVs 108. Thus, each user can have essentially his/her own Internet TV channel without losing privacy in viewing his/her individually requested Internet contents.

Further, the cable box 110 includes the frame grabber 132. The frame grabber 132 is used to locally refresh the Internet contents and/or telephone interface menu displayed on the user television until a subsequent request is made to change the Internet contents. Since the changes from one Internet content frame to the next Internet content frame are generally small and made in slow speed, e.g. one's speaking speed, the system can be adapted to be used by a virtual number of users, as opposed to a limited number of users in a typical video-on-demand circuit system. It is also noted that the ISP may be a part of a cable operator (not shown) without departing from the present invention.

FIG. 3 illustrates the telephone interface and voice recognition driven Internet browser system 112 implemented for a plurality of users/subscribers 130 to access/browse the Internet on their respective TVs 108 in accordance with the principles of the present invention. It is appreciated that the system may include an intelligent router to send a subscriber requested Internet contents directly to that subscriber without broadcasting the requested Internet contents to all of the other subscribers before filtering out.

Figure 4:
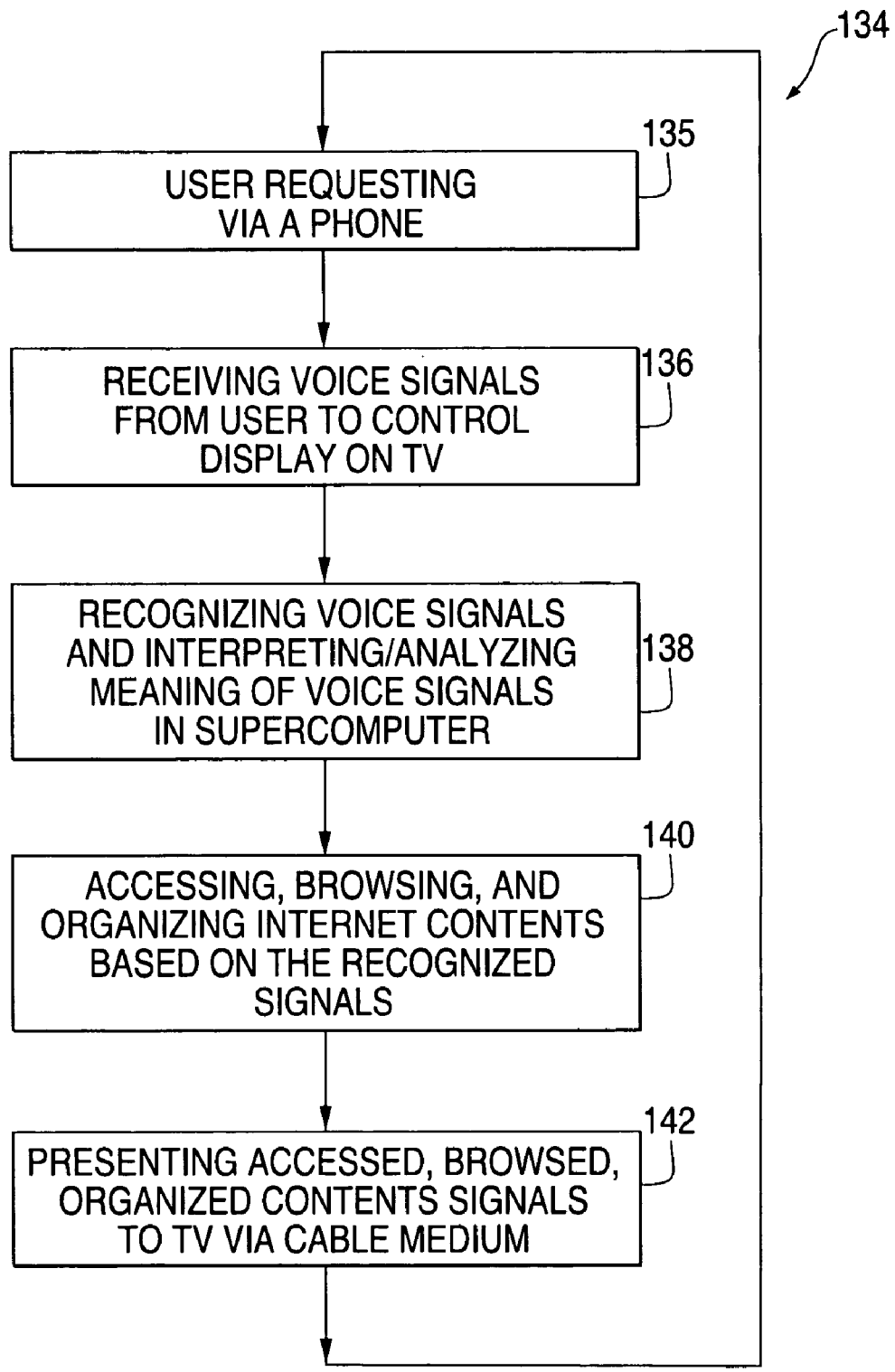
FIG. 4 illustrates one implementation of an operational flow of a method of a telephone interface and voice recognition driven accessing/browsing Internet contents on a cable television in accordance with the principles of the present invention.

FIG. 4 illustrates one implementation of an operational flow 134 of a method of telephone interface and voice recognition driven accessing/browsing Internet contents on a cable TV in accordance with the principles of the present invention. The operational flow 134 starts with user requesting via a phone in an operation 135. The voice signals of the user are received and are used to control the display on the user's cable TV in an operation 136. Then, the voice signals are recognized/interpreted/analyzed at the voice recognizer which may be run on a supercomputer in an operation 138. The voice recognizer generates command signals corresponding to the voice signals to access/browse the Internet. Next, the Internet contents are accessed, browsed, and/or organized based on the command signals from the voice recognizer in an operation 140. Then, the data or information, such as the Internet contents and/or telephone interface menu, are processed and presented on the user's cable TV via cable media/cable box in an operation 142. The user may make a further request to interact with the data or information presented on the cable TV in the operation 135. It is appreciated that the operational flow 134 may terminate, pause, or continue at any time by the user. It is also appreciated that the operational flow 134 may include a timing function to ensure that the operational flow 134 will be terminated if the user does not pause or continue the operation 135 within a predetermined period of time.

It is appreciated that the telephone interface command menu can be in a variety of forms. The interface may include commands such as edit, exit, show previous, show next, etc.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for viewing data retrieved over the Internet on a television system, the method comprising:

receiving a voice signal transmitted from a user over a phone network, the voice signal including an instruction for browsing the Web;

identifying, at a location remote to the user, a Web browsing instruction corresponding to the instruction included in the received voice signal;

retrieving data corresponding to the Web browsing instruction; and transmitting the retrieved data to the user over a television network;

whereby at least portions of the retrieved data can be displayed on the television system associated with the user.

2. The method of claim 1, wherein receiving the voice signal transmitted from the user over the phone network comprises:
receiving, at a cable hub, the voice signal transmitted from the user over the phone network.

3. The method of claim 1, wherein receiving the voice signal transmitted from the user over the phone network comprises:
receiving, at a phone hub, the voice signal transmitted from the user over the phone network.

4. The method of claim 1, wherein the voice signal transmitted from the user over the phone network is transmitted over a digital phone network.

5. The method of claim 1, wherein identifying the Web browsing instruction corresponding to the received voice signal comprises:
analyzing the voice signal with a natural language representation system.

6. The method of claim 1, wherein retrieving data corresponding to the Web browsing instruction comprises:
sending a request to a Web server for data corresponding to the Web browsing instruction.

7. The method of claim 1, wherein retrieving data corresponding to the Web browsing instruction comprises:
sending a request to a remote Web server for data corresponding to the Web browsing instruction.

8. The method of claim 1, wherein transmitting the retrieved data to the user over the television network comprises:
including a unique identifier with the transmitted data;
wherein the unique identifier is associated with the user and unable to direct the transmitted data to the user.

9. The method of claim 1, wherein transmitting the retrieved data to the user over the television network comprises:
including a unique identifier with the transmitted data;
wherein the unique identifier is associated with a particular set top box.

10. The method of claim 1, wherein identifying the Web browsing instruction corresponding to the received voice signal comprises:
identifying, at a cable hub, the Web browsing instruction corresponding to the received voice signal.

11. The method of claim 1, wherein identifying the Web browsing instruction corresponding to the received voice signal comprises:
identifying, at a phone hub, the Web browsing instruction corresponding to the received voice signal.

12. The method of claim 1, wherein transmitting the retrieved data to the user over the television network comprises:
transmitting the retrieved data to the user over a satellite television network.

13. The method of claim 1, wherein transmitting the retrieved data to the user over the television network comprises:
transmitting the retrieved data to the user using a digital television network.

14. The method of claim 1, wherein transmitting the retrieved data to the user over the television network comprises:
transmitting the retrieved data to the user over a particular television channel.

15. The method of claim 1, further comprising:
identifying a phone number associated with the origination of the voice signal;
identifying an address associated with the phone number; and
including the address in the transmitted data;
whereby the included address can be used to direct the transmitted data to the user.

16. The method of claim 15; wherein the included address phone number comprises:
is unable to prevent other users from receiving the transmitted data.

17. The method of claim 15, wherein identifying an address associated with the phone number comprises:
identifying an identifier for equipment associated with the user.

18. The method of claim 15, wherein identifying an address associated with the phone number comprises:
identifying a unique identifier for the user.

19. The method of claim 1, wherein the phone network comprises a PSTN.

20. The method of claim 19, wherein the television system comprises a cable box.

21. The method of claim 1, wherein the television system comprises a television.

22. A method for viewing data retrieved over the Internet on a television, the method comprising:
receiving a voice signal delivered over a telephone network at a location remote from a user;
identifying a Web browsing instruction corresponding to the received voice signal;
retrieving data corresponding to the Web browsing instruction; and
transmitting the retrieved data to the user over a television network;
whereby the retrieved data can be displayed on the television.

23. A method for viewing data retrieved over the Internet on a television, the method comprising:
receiving a voice signal transmitted from a user over a data transmission network;
identifying, at a location remote to the user, a Web browsing instruction corresponding to the received voice signal;
retrieving data corresponding to the Web browsing instruction; and
transmitting the retrieved data to the user over a television network;
whereby at least portions of the retrieved data can be displayed on the television.

24. The method of claim 23, wherein receiving the voice signal transmitted from the user over the data transmission network comprises:
receiving the voice signal transmitted from a user over a phone network.

25. The method of claim 23, wherein receiving the voice signal transmitted from the user over the transmission network comprises:
receiving the voice signal transmitted from the user over a cable network.

* * * * *